(12) United States Patent
Skudder et al.

(10) Patent No.: US 8,328,353 B2
(45) Date of Patent: Dec. 11, 2012

(54) SEGMENTED DELTA TORIC LENS

(75) Inventors: Colin David Skudder, Taoyuan County (TW); Jacob Liao, Taoyuan County (TW)

(73) Assignee: Pegavision Corporation, Taoyuan County (TW)

( * ) Notice: Subject to any disclaimer, the term of this patent is extended or adjusted under 35 U.S.C. 154(b) by 92 days.

(21) Appl. No.: 13/015,537

(22) Filed: Jan. 27, 2011

(65) Prior Publication Data
US 2012/0194778 A1 Aug. 2, 2012

(51) Int. Cl.
*G02C 7/04* (2006.01)
(52) U.S. Cl. .......... 351/159.38; 351/159.36; 351/159.21
(58) Field of Classification Search . 351/159.01–159.72
See application file for complete search history.

(56) References Cited

U.S. PATENT DOCUMENTS

| | | | | |
|---|---|---|---|---|
| 4,318,595 A | * | 3/1982 | Van der Kolk et al. | .. 351/159.21 |
| 4,874,234 A | * | 10/1989 | Wichterle | ................ 351/159.21 |
| 7,475,983 B2 | * | 1/2009 | Ye et al. | ................... 351/159.21 |
| 7,758,187 B2 | * | 7/2010 | Amirparviz | ............. 351/159.28 |
| 2002/0024631 A1 | * | 2/2002 | Roffman et al. | .............. 351/161 |

* cited by examiner

*Primary Examiner* — Darryl J Collins
(74) *Attorney, Agent, or Firm* — CKC & Partners Co., Ltd.

(57) ABSTRACT

A segmented delta toric lens is described. The segmented delta toric lens includes an optical area, a circumference area surrounding the optical area and a segmented delta protrusion formed on the circumference area. The segmented delta protrusion is located apart from the optical area and the edge of the circumference area. The segmented delta toric lens can further include a mark to indicate a direction of the segmented delta toric lens.

18 Claims, 1 Drawing Sheet

SEGMENTED DELTA TORIC LENS

FIELD OF THE INVENTION

The present invention generally relates to a toric lens. More particularly, the present invention relates to a segmented delta toric lens.

BACKGROUND OF THE INVENTION

Currently, the use of contact lenses for the correction of visual acuity is well known. Contact lens is more convenient than eyeglasses for most occasions, therefore, it becomes more popular recently.

Astigmatism is a defect in the eye that is corrected by a lens with a non-spherical prescription. The prescription, which is usually expressed as cylinder on the patient's prescription order, causes at least a portion of the surface of the lens to have an oval shape. Such lenses are called toric lenses. Nowadays, toric lenses are used for correction of the wearers astigmatism. The corrective lens must be properly oriented with respect to the eye of the wearer. That is, the intended top of the lens must be at the top of the wearer's eye. For ordinary glasses this presents no problem, because the lens is permanently fixed to the frame at the correct rotational orientation. The ear and nose pieces of the frame assure that the frame and the lens do not rotate with respect to the wearer's eyes. For contact lenses orientation is subject to constant alteration. In the case of contact lenses whose function is to correct astigmatism this is unacceptable.

Some of the toric lenses are oriented with the lens' thickness differential. However, these toric lenses are disadvantageous in that they rely on the interaction of the eyelid margin and the lens' thickness differential to orient an axis alignment of the toric lens on the wearer's eye. As the thickness of the lens increases in the optical area of the lens, the lens becomes thicker and heavier so as to make the user uncomfortable.

Therefore, there is a need to correct the axis alignment of the contact lens without increasing the thickness of the contact lens in the optical area thereof.

SUMMARY OF THE INVENTION

One objective of the present invention is to provide a toric lens having at least one segmented delta protrusion on a circumference area of the toric lens to orient an axis alignment of the toric lens on a user's eye.

To achieve these and other advantages and in accordance with the objective of the present invention, as the embodiment broadly describes herein, the present invention provides a segmented delta toric lens having an optical area, a circumference area surrounding the optical area and a segmented delta protrusion formed on the circumference area. The segmented delta protrusion is located apart from the optical area and an edge of the circumference area. The segmented delta toric lens can further include a mark to indicate a direction of the segmented delta toric lens, e.g. a bottom direction of the segmented delta toric lens or a top direction of the segmented delta toric lens.

The segmented delta protrusion is preferably apart from the edge of the circumference area about 1.0 to 3.0 millimeter (mm). The segmented delta protrusion is preferably apart from the optical area of the segmented delta toric lens about 1.0~3.0) millimeter (mm).

The width of the segmented delta protrusion is preferably about 10.0 to 12.0 millimeter (mm), and the height of the segmented delta protrusion protruding from the front surface of the segmented delta toric lens is about 0.2 to 0.4 millimeter (mm).

In a preferred embodiment, the thickness of the edge of the circumference area is consistent. The diameter of the segmented delta toric lens is about 14.0 to 16.0 millimeter (mm) as well as the diameter of the optical area of the segmented delta toric lens is about 4.0 to 13.0 millimeter (mm).

Hence, the toric lens of the present invention can use the segmented delta protrusion to provide a suitable weight and shape to orient the axis alignment of the toric lens on the wearer's eye. Furthermore, the segmented delta protrusion does not influence the thickness of the optical area and the edge of the toric lens so that the wearer can feel more comfortable.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
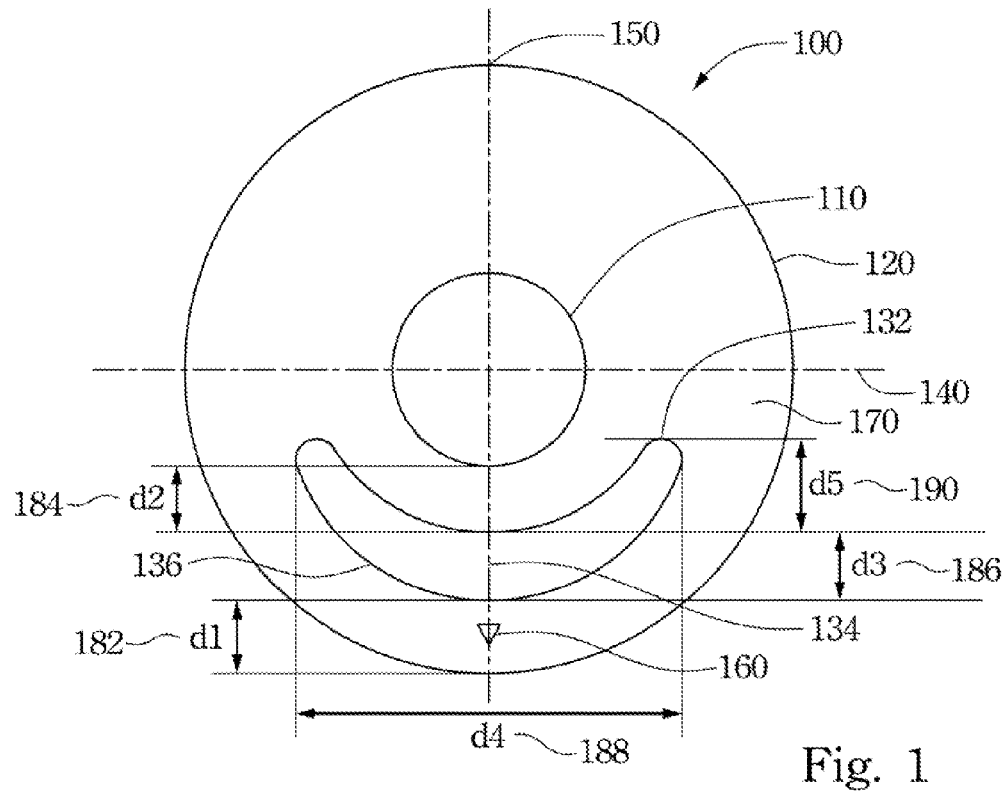
FIG. 1 illustrates a front view of an embodiment of a segmented delta toric lens according to the present invention.
Figure 2:
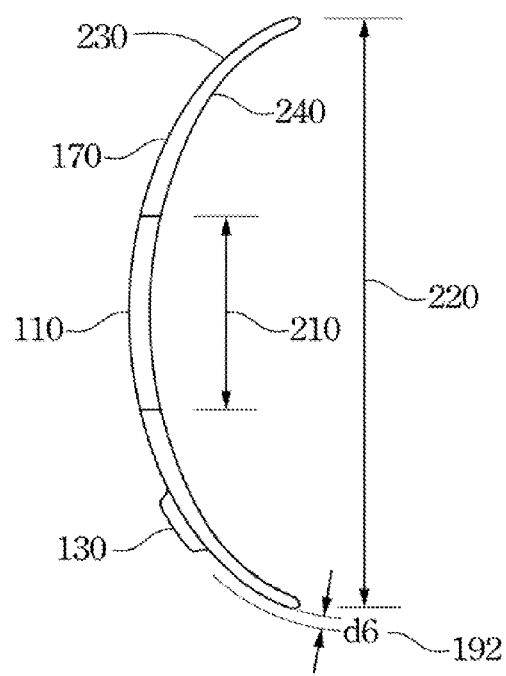
FIG. 2 illustrates a side view of the embodiment of the segmented delta toric lens according to the present invention shown in FIG. 1.

Refer to FIG. 1 and FIG. 2. FIG. 1 illustrates a front view of an embodiment of a segmented delta toric lens according to the present invention. FIG. 2 illustrates a side view of the embodiment of the segmented delta toric lens according to the present invention shown in FIG. 1.

The toric lens 100 has an optical area 110 and a circumference area 170 surrounding the optical area 110. The diameter 210 of the optical area 110 is about 4.0 to 13.0 millimeter (mm) as well as the diameter 220 of the toric lens 100 is about 14.0 to 16.0 mm. Furthermore, the toric lens 100 has a segmented delta protrusion 130 formed on a front surface 230 of the toric lens 100. The segmented delta protrusion 130 is located on the circumference area 170 of the toric lens 100 and apart from the optical area 110 and the edge 120 of the toric lens 100. Therefore, the segmented delta protrusion 130 does not influence on the visual effect. In addition, since the segmented delta protrusion 130 is located apart from the edge 120 of the toric lens 100, the wearer can feel more comfortable.

The width 188 (d4) of the segmented delta protrusion 130 is about 10.0 to 12.0 mm, the height 186 (d3) of the middle portion 134 of the segmented delta protrusion 130 is about 5.0 to 7.0 mm. In addition, the terminal 132 of the segmented delta protrusion 130 is higher than the middle portion 134 about 1.0~3.5 mm, see dimension d5. Furthermore, the height 192 (d6) of the segmented delta protrusion 130 protruding from the front surface 230 of the toric lens 100 is about 0.2 to 0.4 mm. Preferably, the edge 136 of the segmented delta protrusion 130 gradually sinks into the front surface 230 of the toric lens 100.

The front surface 230 and the rear surface 240 are smooth surfaces and the segmented delta protrusion 130 is formed on the front surface 230 without influence on the edge 120 of the toric lens 100 and the optical area 110 of the toric lens 100. The segmented delta protrusion 130 is preferably apart from the optical area 110 of the toric lens 100 about 1.0~3.0 mm, see d2. In addition, the segmented delta protrusion 130 is preferably apart from the edge 120 of the toric lens 100 about 1.0 to 3.0 mm, see d1.

The toric lens 100 preferably has a mark 160 formed thereon to indicate the wearer the direction of the toric lens 100. For example, the mark 160 can be formed on the vertical axis 150 to show the bottom direction of the toric lens 100, vice versa.

Accordingly, the toric lens 100 can use the segmented delta protrusion 130 to provide a suitable weight and shape to orient the axis alignment of the toric lens 100 on the wearer's eye. In addition, the segmented delta protrusion 130 does not influence the thickness of the optical area 110 and the edge 120 so that the wearer can feel more comfortable. Preferably, the thickness of the edge 120 of the toric lens 100 is consistent.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A segmented delta toric lens, comprising:
   an optical area;
   a circumference area surrounding the optical area; and
   a segmented delta protrusion formed on the circumference area and apart from the optical area and an edge of the circumference area, wherein a width of the segmented delta protrusion is about 10.0 to 12.0 millimeter (mm).

2. The segmented delta toric lens of claim 1, further comprising a mark to indicate a direction of the segmented delta toric lens.

3. The segmented delta toric lens of claim 2, wherein the mark indicates a bottom direction of the segmented delta toric lens.

4. The segmented delta toric lens of claim 1, wherein the segmented delta protrusion is apart from the edge of the circumference area about 1.0 to 3.0 millimeter (mm).

5. The segmented delta toric lens of claim 4, wherein the segmented delta protrusion is apart from the optical area of the segmented delta toric lens about 1.0~3.0 millimeter (mm).

6. The segmented delta toric lens of claim 1, wherein a height of the segmented delta protrusion protruding from a front surface of the segmented delta toric lens is about 0.2 to 0.4 millimeter (mm).

7. The segmented delta toric lens of claim 1, wherein the thickness of the edge of the circumference area is consistent.

8. The segmented delta toric lens of claim 1, wherein the diameter of the segmented delta toric lens is about 14.0 to 16.0 millimeter (mm).

9. The segmented delta toric lens of claim 1, wherein the diameter of the optical area of the segmented delta toric lens is about 4.0 to 13.0 millimeter (mm).

10. A segmented delta toric lens, comprising:
    an optical area;
    a circumference area surrounding the optical area; and
    a segmented delta protrusion formed on the circumference area and apart from the optical area and an edge of the circumference area; and
    a mark to indicate a direction of the segmented delta toric lens, wherein a width of the segmented delta protrusion is about 10.0 to 12.0 millimeter (mm).

11. The segmented delta toric lens of claim 10, wherein the mark indicates a bottom direction of the segmented delta toric lens.

12. The segmented delta toric lens of claim 10, wherein the mark indicates a top direction of the segmented delta toric lens.

13. The segmented delta toric lens of claim 10, wherein the segmented delta protrusion is apart from the edge of the circumference area about 1.0 to 3.0 millimeter (mm).

14. The segmented delta toric lens of claim 13, wherein the segmented delta protrusion is apart from the optical area of the segmented delta toric lens about 1.0~3.0 millimeter (mm).

15. The segmented delta toric lens of claim 10, wherein a height of the segmented delta protrusion protruding from a front surface of the segmented delta toric lens is about 0.2 to 0.4 millimeter (mm).

16. The segmented delta toric lens of claim 10, wherein the thickness of the edge of the circumference area is consistent.

17. The segmented delta toric lens of claim 10, wherein the diameter of the segmented delta toric lens is about 14.0 to 16.0 millimeter (mm).

18. The segmented delta toric lens of claim 10, wherein the diameter of the optical area of the segmented delta toric lens is about 4.0 to 13.0 millimeter (mm).

* * * * *